Aug. 27, 1963  C. S. WHITE  3,101,961
MOLDED BEARINGS HAVING LOW FRICTION MATING SURFACES
Original Filed June 16, 1955  2 Sheets-Sheet 1
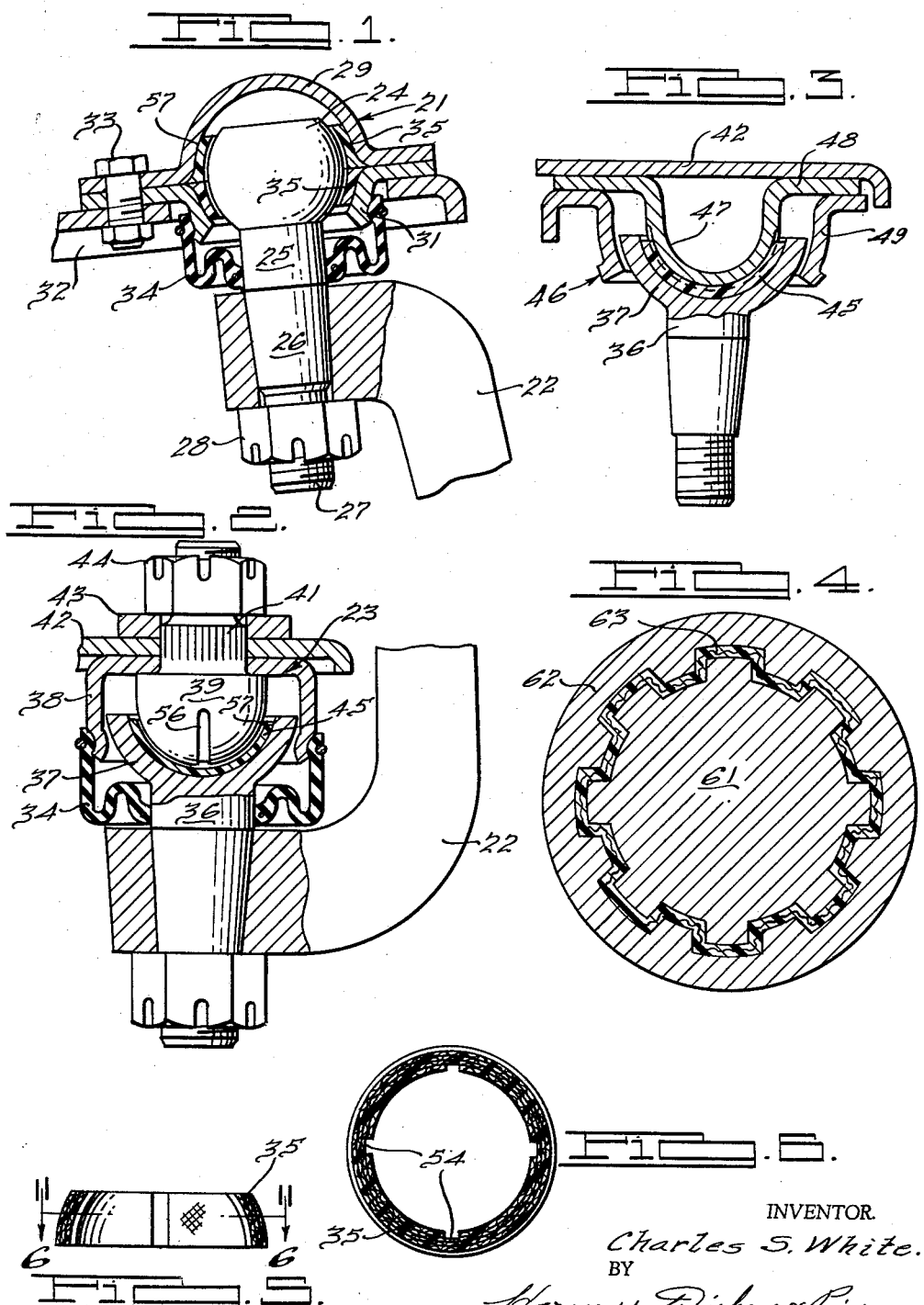
INVENTOR.
Charles S. White.
BY
Harness, Dickey & Pierce
ATTORNEYS.

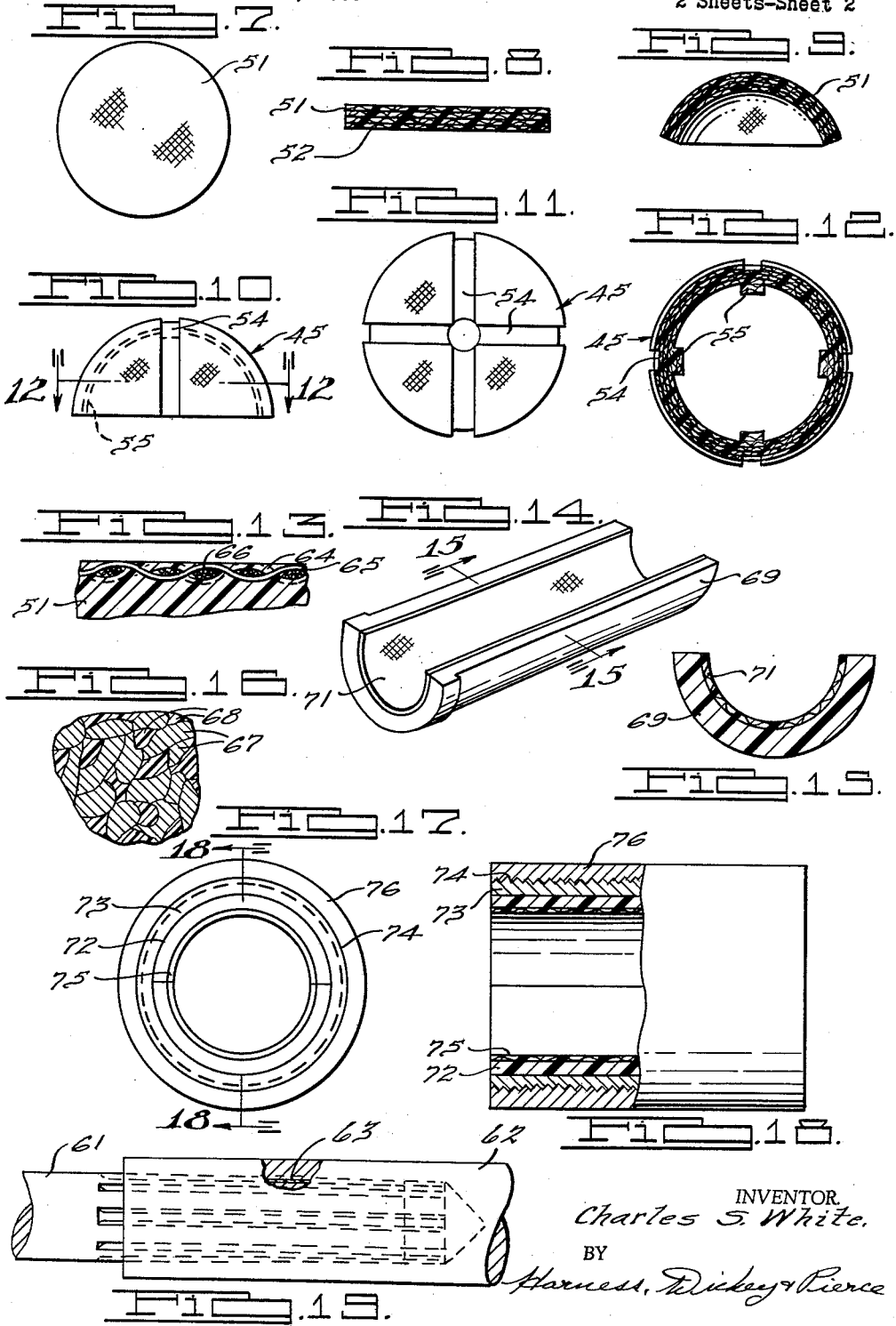

United States Patent Office 3,101,961
Patented Aug. 27, 1963

3,101,961
MOLDED BEARINGS HAVING LOW FRICTION
MATING SURFACES
Charles S. White, Rte. 3, Box 454–H, Palmdale, Calif.
Original application June 16, 1955, Ser. No. 516,003, now Patent No. 2,885,248, dated May 5, 1959. Divided and this application May 4, 1959, Ser. No. 810,911
7 Claims. (Cl. 287—52)

This invention relates to bearings, and particularly to a built-up type of bearing made from resinous, sintered and like materials, and is a division of copending application, Serial No. 516,003, filed on June 16, 1955, now Patent 2,885,248.

Various attempts have been made heretofore to employ plastic resinous material for bearings which for certain applications have proved satisfactory. For heavy or concentrated loads, such bearings have proved inadequate, primarily because the material which provided strength against flow had high friction characteristics.

In one form of the present invention, a thermosetting type of resin material is employed which is shaped to the form of a mating bearing element when in postsettable stage so that after it is shaped to mate with a bearing surface it may be hardened by the application of heat. The material is built up to provide strength against flow and distortion under load and the bearing surface is preferably formed of an embedded resinous material which has low friction characteristics so that little resistance to initial breakaway is offered.

One method of forming the plastic insert for a ball and socket assembly, by way of example, would be to employ circular fabric disks to form a solid background. Such disks are made of light canvas impregnated with phenoformaldehyde resin or a similar type of thermosetting resinous material. A final layer of Teflon cloth is placed on the plurality of layers which are then cold-shaped in a semispherical form in a die set or similar device. This assembly is then placed in the cavities of a die set of a type to which pressure and heat may be applied. The time and heat are accurately regulated so as not to completely cure the resin material but have it retained in a postsettable stage. The assembly thus made has the Teflon cloth physically bonded thereon by the passage of the resinous material through the interstices of the cloth. The surface of resinous material formed over the threads of the Teflon cloth is removed by some simple process, such as vapor blasting and the like. A fluid under pressure containing a fine abrasive is directed over the surface to remove the resinous material and expose the threads of the Teflon cloth material.

During the molding stage, the cavities and mating die portions are so shaped as to provide projections and recesses on opposite sides of the inserts. The recessed areas are provided on the bearing surface to retain a lubricant therein, while the mating projections on the opposite side engage recesses in the supporting member which positions and anchors the insert against a turning movement. It is to be understood that a bonding material may be placed between the surfaces of the insert and supporting member to further securely anchor the insert in place. The insert is placed between a ball and socket of a joint and pressure is applied between the ball, insert and the socket in an amount depending upon the size of the joint to cause the material of the insert to form itself accurately to the ball and the cavity of the socket. While in pressure relationship, heat is applied at a temperature sufficient to set the resinous material to have the insert hardened when in mating relationship with the bearing surface. When lubrication is desired, a lubricant is placed within the recesses of the insert and the mating surface of the ball before the pressure is applied to the assembly. In certain applications the Teflon material will provide the necessary lubricating features since it is of the low friction type and no noticeable amount of increased force will be required for initially breaking the joint.

Accordingly, the main objects of the invention are: to provide a bearing made of a material sufficient to resist deforming when loaded and having a low friction material embedded in the bearing face thereof; to provide a bearing made of a resin material having a low friction resinous material embedded in its bearing surface which reduces resistance to break-away and provides a cool operating bearing surface; to construct a bearing of sintered material having embedded in the interstices thereof a low friction material which provides low friction operating characteristics to the bearing; to form a bearing of a backing material in postsettable stage having embedded in the mating bearing surface a low friction resinous material, all of which is formed to a mating bearing surface under pressure and hardened by the application of heat, and, in general, to provide a bearing made of a formable material having embedded therein a low friction material, all of which is simple in construction and economical of manufacture.

Other objects and features of novelty of the invention will be specifically pointed out or will become apparent when referring, for a better understanding of the invention, to the following description taken in conjunction with the accompanying drawings, wherein:

FIGURE 1 is a sectional view of a ball and socket type of bearing, embodying features of the present invention;

FIG. 2 is a broken sectional view of a ball and socket joint, similar to the joint illustrated in FIG. 1, showing another form thereof;

FIG. 3 is a sectional view of a joint, similar to that illustrated in FIG. 2, showing a further form which the joint may assume;

FIG. 4 is a view of a splined shaft and socket having a bearing sleeve therebetween to provide a perfect engagement between the splined areas thereof;

FIG. 5 is a sectional view of a plastic insert employed in the ball and socket bearing of FIG. 1;

FIG. 6 is a broken sectional view of the structure illustrated in FIG. 5, taken on the line 6—6 thereof;

FIG. 7 is a plan view of an impregnated disk a plurality of which form the body portion of the insert of the bearing illustrated in FIGS. 2 and 3;

FIG. 8 is a sectional view of a plurality of the disks illustrated in FIG. 7 shown in stacked relationship;

FIG. 9 is a view of the stacked disks of FIG. 8 after being cold formed to semispherical shape;

FIG. 10 is a view of an insert molded from the assembly of FIG. 9;

FIG. 11 is a plan view of the structure illustrated in FIG. 10;

FIG. 12 is a sectional view of the structure illustrated in FIG. 10, taken on the line 12—12 thereof;

FIG. 13 is an enlarged, broken sectional view of the bearing surface of the inserts illustrated in FIGS. 5 to 12 inclusive;

FIG. 14 is a perspective view of a heavy bearing embodying features of the present invention;

FIG. 15 is a sectional view of the structure illustrated in FIG. 14, taken on the line 15—15 thereof;

FIG. 16 is an enlarged, broken plan view of a surface of a bearing formed from sintered particles;

FIG. 17 is a view of a bearing, similar to that illustrated in FIG. 14, when in cylindrical shape;

FIG. 18 is a broken sectional view of the structure illustrated in FIG. 17, taken on the line 18—18 thereof, and FIG. 19 is a reduced side view of the structure of FIG. 4, showing the slight taper to the engaged splines lengthwise of the shaft.

In FIG. 1 a ball and socket joint 21 is illustrated mounted on a yoke 22 having a spindle thereon (not shown) for supporting a front wheel of a vehicle. In FIG. 2 a ball and socket joint 23 is illustrated mounted on the bottom end of the yoke 22, both of the joints being shown in position of assembly, the joint 21 being disposed at an angle to the vertical. The joint 21 comprises a truncated ball 24 having a stud 25 thereon provided with a tapered portion 26 terminating in a threaded end 27. The stud is secured by a nut 28 to one arm of the yoke 22. A dished stamping 29 mates with an apertured dished stamping 31 about the ball 24, the two stampings being assembled on a supporting arm 32 of the vehicle by suitable means, herein illustrated as by bolts 33. A sealing element 34 is sealed to the dish-shaped stamping 31 and the stud 25 of the ball 24 to prevent the entrance of dirt and grime to the cavity about the ball. A pair of oppositely disposed, truncated, hollow spherical inserts 35 is mounted about the ball in pressure engagement with the stampings 29 and 31.

The ball and socket joint 23 of FIG. 2 embodies a stud 36, similar to the stud 25, having a socket 37 thereon in place of the ball 24. A cup-shaped element 38 surrounds the socket 37 and contains a truncated solid ball 39 on a stem 41 which is mounted on a supporting arm 42 of the vehicle by a washer 43 and nut 44. A sealing element 34 seals the cup-shaped element 38 and the stud 36. Between the socket 37 and the ball 39, an insert 45 is provided, constructed in a manner hereinafter described.

In FIG. 3 a similar ball and socket joint 46 is illustrated, employing the same stud 36 and socket 37 but having a hollow ball 47 provided on a stamping 48. A dish-shaped stamping 49 mates with the stamping 48 and permits a seal to be employed between the stamping 48 and the stud 36. An insert 45 is employed between the ball portion 47 and the socket 37.

Referring to FIGS. 5 to 13 inclusive, the manner of constructing the inserts 35 and 45 will now be described in detail. The main body portion of the insert may be of any material known in the art to be suitable which has a presettable stage so that it may be formed to the shape of a mating bearing surface and set thereafter. In the example shown, the insert is made up of a plurality of layers of cloth material, such as light canvas impregnated with a suitable resinous material. The layers 51 are preferably cut in circular form and stacked upon each other. The top layer 52 which is to form the bearing surface is of Teflon cloth material which will be physically bonded to the resinous material of the disks 51. It is to be understood that the mentioning of the phenoformaldehyde material impregnating the disks 51 was by way of example since it is well known to those skilled in the art that other types of thermosetting resins may be substituted therefor. It is to be further understood that the resin material may be used to form the body of the insert without the cloth material embedded therein and with the layer of Teflon or like low friction material embedded in the bearing surface.

The Teflon material 51 is a type of resin which will withstand 600° operating temperature. This is desirable to produce bearings which must withstand such temperature. A resin for the body would be employed which is moldable to a desired shape at such high temperatures but which will, upon cooling, become permanently set. The Teflon cloth, when employed in combination with such thermoplastic materials, will produce the low friction type of surface to the bearing and will withstand therewith the high operating temperatures. The Teflon material itself could not be employed successfully to construct such a bearing since above 600° F. it becomes jelly-like in form and flows under pressure when in a cold stage. The combination, however, of the Teflon cloth on the surface of a bearing constructed of either thermoplastic or thermosetting material provides the desired low friction characteristic, while the solid backing body portion prevents any deforming or flow of the material. The Teflon cloth herein referred to is by way of example, since other low friction material, such as nylon and the like, may be substituted for the Teflon on the bearing surface of the insert or bearing body.

Powdered Teflon, nylon and like substances were first employed upon the surface of the insert but, due to the cold flowing of these materials under pressure, they could not be retained in contact with the mating bearing surface. By employing such materials in sheet form, such as woven cloth, perforated sheets, or sheets having granular surface, or fibers woven into a porous material having interstices so that a physical bond could occur between such sheet material and the backing material, satisfactory retention of the low friction material is obtained. The physical bonding of the low friction material by the backing material prevents the cold flowing of the Teflon or like material and the low friction characteristics are maintained between the mating bearing surfaces. Before the final presetting stage, it is desirable to remove the film of bonding resin material from the surface of the low friction material by some suitable means, as by air blasting or the like, as hereinabove mentioned. In some types of bearings, the film of bonding resin material will wear rapidly away, exposing the low friction material which will then be in contact with the mating bearing surface. When employing the Teflon and like materials, providing the low friction characteristics, the resulting bearing will have a low friction break-away, coupled with the antifriction properties which are desirable between the bearing surfaces.

After the several layers 51 have been assembled with the top layer 52 of Teflon or like material, the assembly is then cold shaped to a semispherical form, as illustrated in FIG. 9. These assemblies are then placed in a multicavity mold and shaped to the form illustrated in FIGS. 10, 11 and 12 under pressure and heat, the heat being applied for a sufficient time to cure the resinous material to the presettable stage. The mold for the insert 45 is so formed as to provide slots 54 on the outer face of the insert disposed at right angles to each other and inward projections 55 on the inner face in alignment with each other. As illustrated in FIGS. 2 and 3, the balls 39 and 47 are provided with right angularly disposed slots 56 for receiving the inward projections 55 to thereby locate the insert on the ball surface and prevent it from rotating. Preferably a bonding material 57 is provided therebetween to securely bond the insert on the ball surface. A lubricant may be placed in the facing slots 54 of the insert before pressure is provided between the socket 37 and the ball 39 sufficiently to deform the presettable material of the insert 45 to the exact shape of the mating surface of the socket and ball. Heat is then applied to the assembly when under pressure to finally cure the material of the insert to have it retain the exact shape of the spherical sections of the socket 37 in bearing relationship therewith. While it is a simple expedient in the art to accurately finish and polish a ball surface, it is difficult to maintain exact diameters so that a metal ball could accurately be machined to mate with a socket surface. By accurately molding the insert to the ball or socket bearing surface, accurate mating relationship occurs over the entire mating area without the ball and socket being of exact mating diameters.

The insert 35 is constructed in a similar manner, the interior of the insert being the bearing surface for the ball 24. A pair of the sector elements 35 is assembled on the ball, one from the top and the other from the bottom and pressure is provided by the plates 29 and 31 before and during the time heat is applied to set the resinous material which thereafter remains accurately shaped to the ball. In the form herein illustrated, slots 54 are disposed in the inner face of the insert and the projections 55 are omitted, although these could be provided. A suitable bonding material 57 secures the inserts to the dish-shaped portions of the plates 29 and 31. The shaping of the inserts to the ball with pressure on the insert material when in presettable stage and the hardening of the inserts thereafter is illustrated, described and claimed in the co-pending application of Charles S. White, Serial No. 396,893, filed December 8, 1953, now Patent No. 2,835,-521 for Ball Joint Bearing Structure.

The invention is not limited to inserts for ball and socket joints hereinabove described by way of example, but as shown in FIGS. 4, 14 to 19 inclusive, the invention has many other applications. In FIGS. 4 and 19, for example, a tapered spline shaft 61 is to be mated within the tapered splined aperture of a supporting element 62 without any play therein and with surface engagement throughout the entire mating area. In such an arrangement, a splined sleeve 63, made of a thermosetting resin in the presettable stage, is shaped to mate with the splines of the elements 61 and 62 and inserted therebetween. Upon the application of pressure longitudinally between the elements 61 and 62 on the material of the splined sleeve 63, the material is formed to engage the entire mating surfaces between the spline projections and recesses and when heat is applied to the assembly the material of the sleeve is hardened and a substantially solid driving relationship results between the shaft 61 and the supporting element 62.

In FIG. 13 it will be noted that the resinous material 64 of the insert 51 is forced about the threads 65 and 66 of the Teflon cloth material which physically bonds the threads to the resin and provides a film of resin over the outer surface of the threads. This film of material is removed by the vapor blast process or other means as hereinabove referred to before the insert is finally shaped and hardened in the socket assembly.

In FIG. 16 a further form of the invention is illustrated, that wherein particles 67 of brass, iron and the like are sintered together in a manner well known in the art, but in the present instance is sintered in the presence of the Teflon or like material 68 which fills the interstices between the particles 67. With this arrangement, the Teflon or like material provides the low friction characteristics for the bearing surface, which thereby eliminates the use of a liquid lubricant commonly employed.

In FIGS. 14 and 15, a further form of the invention is illustrated, that wherein a heavy journaled sleeve is disclosed similar to that employed on railway cars. The backing 69 of the bearing is constructed in a well known manner of resinous material of sufficient strength and durability to support a load and prevent the cold flow thereof. The surface of the material 71 is made from a sheet of Teflon or like material, which is embedded therein in the manner hereinabove referred to, which provides the low friction characteristic to the engaging surface of the bearing, which thereby reduces the heavy break-away force which would otherwise be required.

In FIGS. 17 and 18 a similar form of the invention is illustrated, that wherein a resinous backing material 72 is bonded to a metal sleeve 73 having a thread 74 on the outer surface. The inner bearing surface 75 has the Teflon or like sheet as hereinabove described embedded therein. The two units are assembled together and threaded within a sleeve 76 which supports the bearing and prevents the endwise movement thereof.

It will thus be seen that the bearings hereinabove described are formed with a backing or body portion which resists deformation under load. The interstices of the bearing face are filled with Teflon or like material which is physically anchored to the body material when the base material is molded to the shape of the bearing and hardened. When the bearing is made of sintered particles, the Teflon or like material, when heated, forms a jell which fills all of the interstices between the particles, to thereby provide the low friction characteristic to the resulting bearing element. When the body material is a resinous material, the Teflon or like material is preferably in woven or sheet form, having interstices through which the resin may pass to physically anchor the material thereto. Such bearings are capable of withstanding load shocks while having a desired low friction characteristic without the presence of a lubricant. Recesses, however, may be provided in the bearing surface in which a lubricant may be retained to further reduce the friction engagement between the bearing surfaces.

What is claimed is:

1. A spline assembly comprising a member having a cylindrical aperture containing lands and grooves forming a spline, a cylindrical member having lands and grooves on its outer surface with the lands of one member disposed in the grooves of the other member, the grooves and lands being so proportioned as to have a substantial space therebetween and with the lands so related as to prevent relative rotation between the members, and a hard low friction material disposed between said lands within said grooves filling the space therebetween and preventing relative rotary movement between the members.

2. The subject matter as claimed in claim 1, wherein said low friction material is fixed to one of said members and disposed in low friction relation with the other said member.

3. The subject matter as claimed in claim 2, wherein the low friction surface of said material is composed of interrelated Teflon fibers.

4. A spline assembly comprising a support member having a splined cylindrical aperture, a splined cylindrical shaft member extending within said aperture with the splines of one member nested in the groove of the other member with a substantial space therebetween and with the splines overlapping so as to prevent any substantial relative rotation between the members, and a hard low friction material disposed within the spaces and preventing any rotational movement between the members.

5. The subject matter of claim 4, wherein at least the surface of said material has low friction characteristics disposed in intimate engagement with the splines of one of said members.

6. The subject matter as recited in claim 5, wherein said surface contains Teflon.

7. Subject matter as recited in claim 4 wherein the cylindrical aperture and shaft are tapered for forming the material therebetween when relative longitudinal pressure is applied between the members.

References Cited in the file of this patent

UNITED STATES PATENTS

| | | |
|---|---|---|
| 536,184 | Case | Mar. 26, 1895 |
| 1,370,073 | Utz et al. | Mar. 1, 1921 |
| 2,199,926 | Swennes | May 7, 1940 |
| 2,259,460 | Dexter | Oct. 21, 1941 |
| 2,317,070 | Tourneau | Apr. 20, 1943 |
| 2,339,967 | Brubaker | Feb. 5, 1946 |
| 2,443,688 | McFarland | June 22, 1948 |
| 2,448,483 | Bassett | Aug. 31, 1948 |
| 2,699,656 | Anderson et al. | Jan. 18, 1955 |
| 2,705,691 | Panagrossi et al. | Apr. 5, 1955 |
| 2,773,781 | Rodman | Dec. 11, 1956 |
| 2,879,091 | Baker | Mar. 24, 1959 |
| 2,960,348 | Sarowski et al. | Nov. 15, 1960 |
| 3,017,209 | Thomas | Jan. 16, 1962 |